July 23, 1968      M. E. ELMORE      3,393,876
RECOVERY OF LEAD FROM WASTE STORAGE BATTERIES
Filed Nov. 21, 1966      2 Sheets-Sheet 1
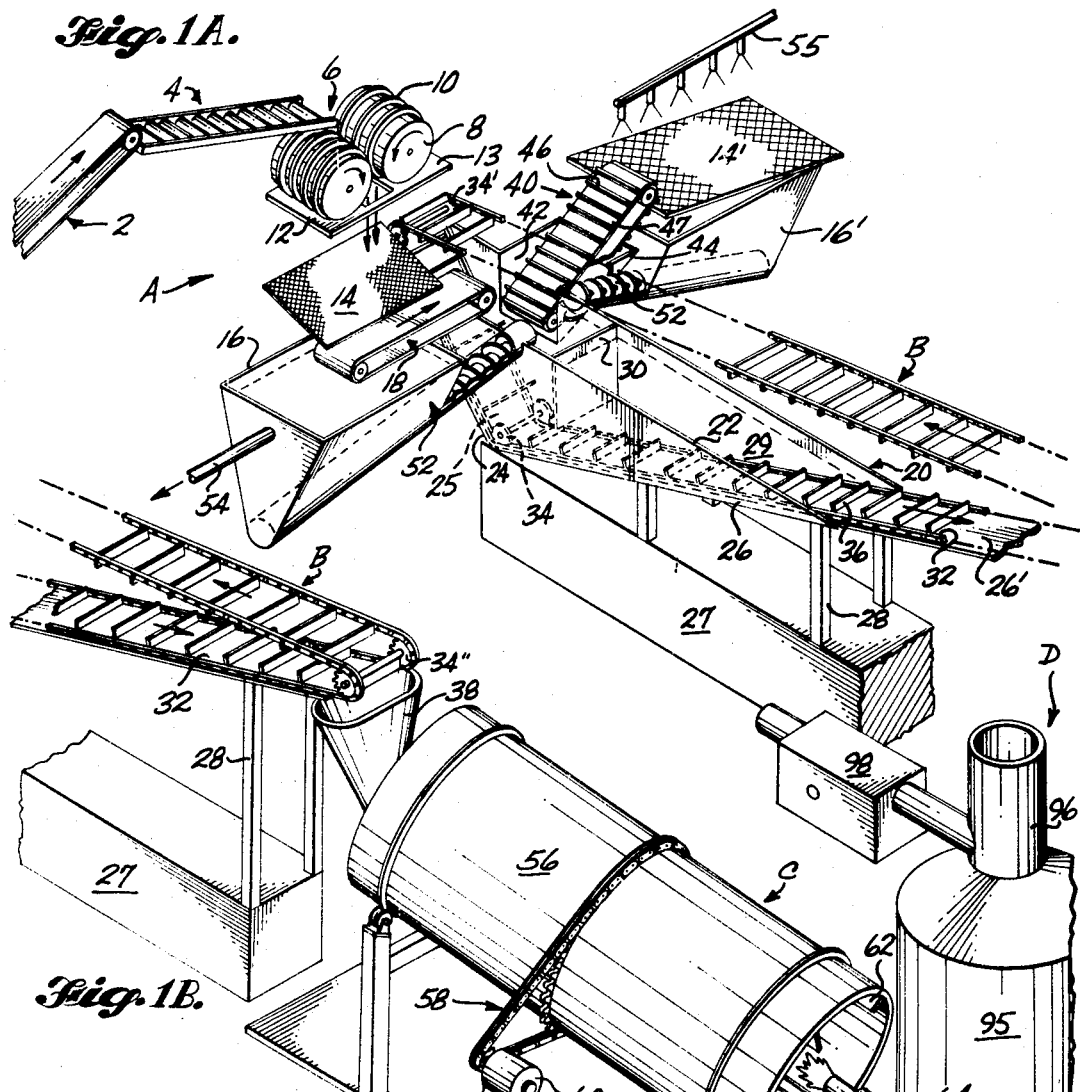
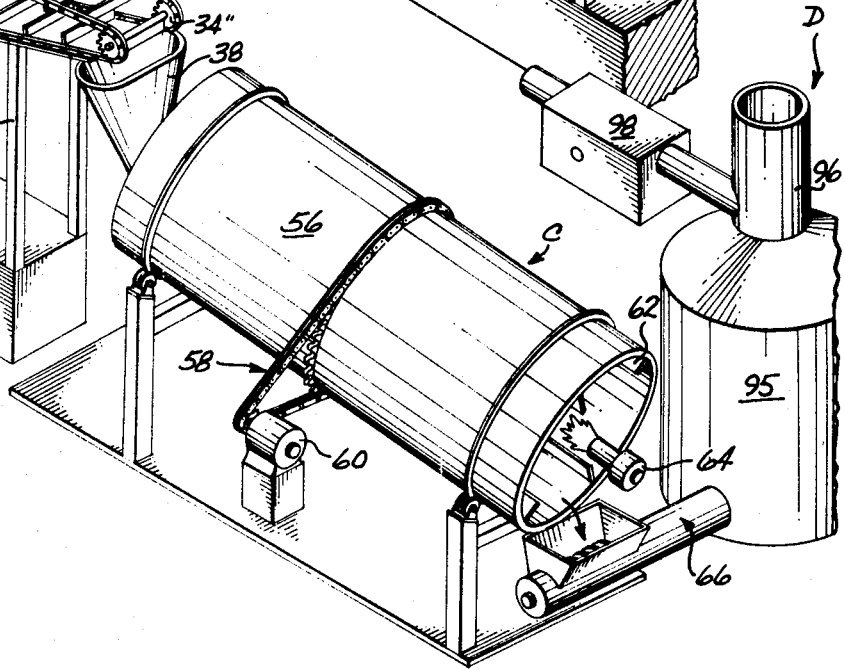
INVENTOR.
MARION E. ELMORE
BY
Christensen, Sanborn
& Matthews
ATTORNEYS

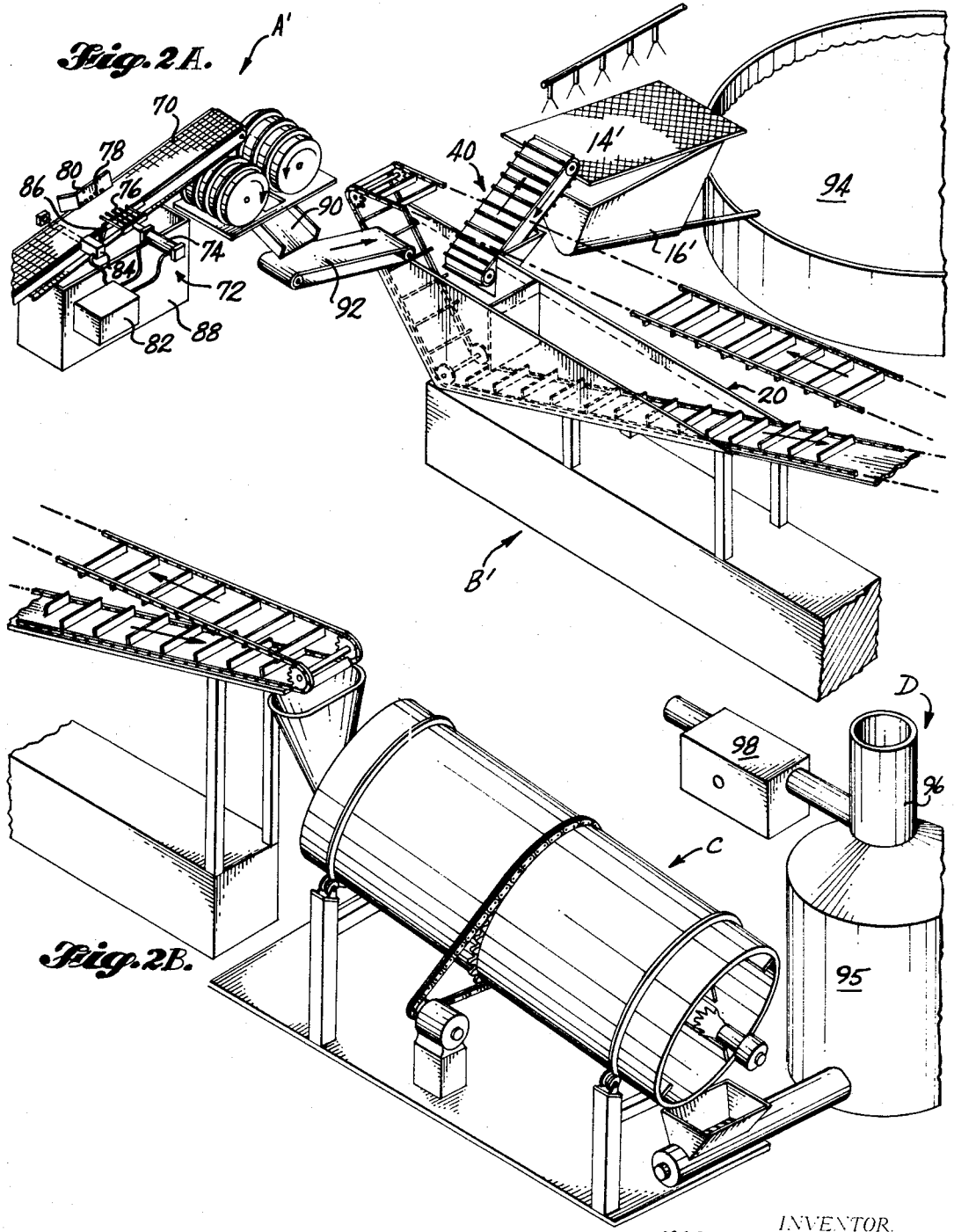

United States Patent Office 3,393,876
Patented July 23, 1968

3,393,876
RECOVERY OF LEAD FROM WASTE
STORAGE BATTERIES
Marion E. Elmore, Seattle, Wash., assignor to Bunker Hill Company, Kellogg, Idaho, a corporation of Delaware
Continuation-in-part of application Ser. No. 296,736, July 22, 1963. This application Nov. 21, 1966, Ser. No. 595,997
9 Claims. (Cl. 241—20)

ABSTRACT OF THE DISCLOSURE

A process is disclosed for the continuous or continual recovery of metallic lead and/or lead alloys from waste storage batteries having lead compound dust in the cells thereof. The process is carried out in a system having sink flotation and smeltering stages therein, and comprises subjecting a first portion of a stream of the batteries to the sink flotation stage by comminuting at least the battery cells therein, and charging the mass of comminuted particles into a liquid suspension of a solid densification medium consisting essentially of lead compound dust, the quantity of which is adjusted to cause the valued and non-valued particles in the mass to separate into diverse regions of the suspension. The valued particles are removed from the suspension and charged into the smeltering stage, together with the lead compound densification medium adhering thereon. Meanwhile or subsequently thereto, a second portion of the stream of batteries is subjected to the sink flotation stage by comminuting at least the battery cells therein and liberating the lead compound dust therefrom, and charging the mass of comminuted particles from such second portion into the aforesaid suspension, together with at least enough of the lead compound dust liberated from the second portion to compensate for the loss of lead compound dust densification medium adhering to the removed particles of the first portion.

---

This invention relates to the recovery of metallic lead and/or useful lead alloys from waste lead acid storage batteries such as those which are discarded from automobiles. More particularly, it relates to the separation of the lead and lead-bearing materials from the non-lead-bearing materials in such batteries. The former are commonly called the valued materials, whereas the latter are the non-valued materials. This terminology will be employed hereinafter.

The present application is a continuation-in-part of my earlier filed application Ser. No. 296,736 which was filed on July 22, 1963, and entitled, Recovery of Lead from Waste Batteries. The earlier application is now abandoned.

The common lead acid storage battery consists essentially of an insulative container or casing which is constructed from rubber, plastic or asphaltic material and which contains a group of electrochemical cells for generating and storing the charge. Suspended in the cells are metallic lead alloy grids which have been impregnated with a paste or filler of lead oxide to form so-called "plates". The plates are separated by insulation dividers, as are the cells, and when the batteries are put to use, the plates are immersed in a sulphuric acid solution to enable an electrolytic charge to be accumulated thereon.

According to conventional practice, there are two principal steps or stages in the recovery of the valued materials from such batteries. The first step is that of separating the valued materials from the non-valued materials. The second step involves the smelting and refining of the valued materials to obtain the elemental metal. In the prior art, the separation stage was carried out in one of two general ways. The more common procedure was to drain the acid residual from the batteries, crush the remaining unit as a whole, and then hand-sort the valued and non-valued materials from one another. The other technique was more mechanized and entailed draining the acid residual, softening the asphalt sealer around the casing in a steam bath or the like, and then removing the cells intact from the casing by sawing off the top of the same or by extracting them by some mechanical means such as vibration, slide ejection, or grappling. Thereafter, the cells were crushed and sent to the smelter. Both processes were highly uneconomical. Hand-sorting is laborsome and has obvious procedural drawbacks. On the other hand, the more mechanized procedure required heavy equipment, a lengthy operation, and despite its mechanization, still as many as seven or eight men to perform the various steps within the operation. It also produced an end product which contained an excessive amount of the non-valued materials, inasmuch as there was no provision for separating the non-valued materials in the cell and plate dividers from the lead-bearing materials in the plates before the crushed cells were sent to the smelter.

It is a principal object of the present invention to provide a more efficient and economical means and technique for reducing waste storage batteries to their valued materials. Another object is to provide a means and technique of this nature which is capable of automation so that there is little or no necessity for operating personnel; and which is also capable of continuing its operation on such a basis for an indefinite length of time. A still further object is to provide an efficient, economical automated process of this nature which requires only simple mechanical equipment that is both inexpensive to install and inexpensive to operate. Other objects include a means and technique of this nature which is capable of extracting the valued materials from a raw battery feed consisting of whole batteries, including the acid residual therein; and of reducing these materials to an intermediate form for smeltering that is uncontaminated by foreign substances and that is free of acid residual. Still further objects will become apparent from the description of the invention which follows.

By way of background, it will be recalled that after a lead acid storage battery has undergone its useful life, a large amount of the acid remains, but in a more dilute form. In addition, much of the lead oxide in the cell plates is converted to another compound of lead, lead sulphate. Both compounds are present in a finely divided state and are loosely held in the plates, as was the original oxide "paste". As a consequence, any disturbance or shock to the plates readily loosens and scatters the compounds, (as well as other compounds and forms of lead which may appear in similar condition on the plates) and they commingle with the acid and accumulate in the bottom of the cells to become what is known in the art as the oxide "mud" or "sludge". In fact, even under normal conditions of use a certain amount of the oxide and/or sulphate may slough off the plates and commingle with the acid. In the average waste storage battery, therefore, there is upward of eight to ten pounds of finely divided material which either is already in a lose condition in the batteries, or can be so liberated from the plates by even a mild form of mechanical or electrical shock. I shall refer to this finely divided material as the "lead compound dust" in the batteries, the term "dust" being used to distinguish the solid particles from the acid which wets them.

It will also be recalled that the furnaces used in the smelting operation are equipped with so-called "bag houses" or other such means for collecting the lead compound dust which is discharged into the furnace flue. A "bag house" is typically a chamber connected with the flue by means of a plurality of "vacuum bags" which are maintained under vacuum by applying negative pressure to the chamber. The dust in the flue is collected in the bags and in this way is prevented from escaping into the atmosphere or otherwise leaving the system.

Now, with this much background, it can be said that a principal feature of the invention is my discovery of a means and technique whereby the "sink flotation" process commonly used by mineralogists, can be used in the waste storage battery art as an economical means for separating the valued materials from the nonvalued materials. "Sink flotation" is a process which in general comprises subjecting a mixture of solid particles of different specific gravities to the buoyant action of a relatively quiescent body of fluid characteristics having such a density that it will float the lighter particles while allowing the heavier particles to sink under the force of gravity. According to the invention, a first portion of a stream of batteries is subjected to the sink flotation stage by comminuting at least the battery cells therein, and charging the mass of comminuted particles into a liquid suspension of a solid densification medium consisting essentially of lead compound dust, the quantity of which is adjusted to cause the valued and nonvalued particles in the mass to separate into diverse regions of the suspension. The valued particles are removed from the suspension and charged into the smeltering stage, together with the lead compound dust densification medium adhering thereon. Meanwhile or subsequently thereto, a second portion of the stream of batteries is subjected to the sink flotation stage by comminuting at least the battery cells therein and liberating the lead compound dust therefrom, and charging the mass of comminuted particles from such second portion into the aforesaid suspension, together with at least enough of the lead compound dust liberated from the second portion, to compensate for the loss of lead compound dust densification medium adhering to the removed particles of the first portion.

Preferably, substantially the whole of the lead compound dust liberated from the second portion is added to the suspension inasmuch as the quantity of densification medium has no critical upper limit, other than the time factor of achieving rapid separation of the particles. I also prefer to comminute the cells of the second portion, and to liberate the lead compound dust therefrom, by the single step of pulverizing the batteries in the whole state, as for example, by passing them through a mechanical crusher.

Ordinarily, the valued particles removed from the suspension, and the lead compound dust densification medium adhering thereon, are also subjected to a drying step before they are charged into the smeltering stage.

The second portion batteries may contain an acid residual, and in such a case the mass of comminuted particles therefrom may be subjected to a screening operation preliminary to being charged into the suspension, so as to separate the residual from the mass. If this is done, the lead compound dust separated with the residual is subsequently removed from the same and separately charged into the suspension. Or in the alternative, the residual in the batteries may be liberated from the same in advance of the comminution step, and in such fashion as to result in no substantial loss of the dust in the batteries. My preferred apparatus for carrying out the process in this manner comprises piercing means which are operative to puncture the battery casings and drain a substantial portion of the acid residual therefrom, without substantial loss of the lead compound dust therein. The punctured batteries are thereafter comminuted by other means, and the mass of comminuted particles and lead compound dust therewith, is subjected to sink flotation as aforedescribed.

It is not necessary, however, that the acid residual be separated from the solid components before the charging step, and in fact, the residual may be charged into the suspension with the solid components so long as provision is made for the dilution effect of the acid on the nature of the suspension. For example, the acid residual in an average run of batteries may amount to as much as a quart and a half of liquid per battery, and it will be appreciated that when multiplied many times over, this quantity of liquid can have a considerable dilution effect on the suspension. To offset this dilution effect, therefore, another feature of the invention calls for collecting a portion of the lead compound dust which is discharged from the furnace in the smeltering stage, and adding it to the suspension from time to time as the acid content in the suspension rises.

These features and advantages are illustrated in the accompanying drawings wherein:

FIGURES 1A and 1B are a schematic representation of one such apparatus; and

FIGURES 2A and 2B are a similar representation of another apparatus which operates in accord with a different technique.

The apparatus in FIGURES 1A and 1B can be regarded as performing four distinct operations. The first is that of comminuting the batteries and separating the acid residual from the mass of comminuted particles. This is carried out in that portion of the apparatus indicated generally at A in the drawing. The second is that of separating the valued and nonvalued particles from one another. This operation is carried out in a sink float separation cell indicated generally at B. The third involves drying the valued materials to prepare them for the smelting operation. A rotary dryer is indicated generally at C for this purpose. And, the fourth involves the smelting operation itself, which is schematically represented at D.

Considering the first operation in detail, reference should be made to the upper left-hand corner of the drawing where a powered belt conveyor 2 enters the apparatus on an upward incline from the horizontal. The batteries are transferred onto this conveyor from such means as are used in transporting them to the processing plant or from an intermediate storage point within the plant. The transfer operation may require the efforts of one or more men working by hand or by mechanical means. Once introduced to the apparatus, however, the batteries require no further handling and the process is fully automated therafter.

The conveyor 2 feeds the batteries upwardly onto a roller conveyor 4 which is downwardly inclined from the conveyor 2 and positioned to feed the batteries into the nip of a roll crusher 6. The crusher is of conventional construction including a pair of rollers 8 equipped with a series of spaced bands 10 which are staggered along the rollers so as to loosely intermesh across the nip. The batteries enter the nip in whole condition and containing the acid residual and lead compound sludge which remained in them at the time they were discarded. The output from the crusher consists therefore of both solid material in particle form and the liquid acid residual which is released from the batteries as they are crushed. This output rains down through a slotted opening 12 in a feeder member 13 which is arranged below the crusher and which may or may not be hoppered. The solid material is caught for the most part on a colander screen 14 positioned under the opening; whereas the released acid drains through the screen and into a settling basin 16 still further below. The lead compound sludge and some of the other smaller solid particles will also escape through the screen, but these are recovered in the settling basin 16 by means which will be described at a later time.

The screen 14 is inclined to the horizontal and vibrated (by means not shown) so that the screened out particles are caused to tumble down its incline onto a powered belt conveyor 18 which serves to collect the particles and to convey them into the sink float separation cell B.

The sink float separation cell is comprised of an elongated open-topped tank 20 which has a triangular cross section along its longitudinal axis, and is upstanding on one vertice so that the rim 22 of the tank is disposed in the horizontal and the legs 24 and 26 of the same are disposed on opposite downward inclines therefrom forming a trough 25 at their intersection. The tank rests on a base 27 and is supported by means of posts 28. The interior of the tank is occupied by a heavy density aqueous suspension 29 which is added to a depth adequate for the purposes of the cell. I prefer to use flue dust from the smelting operation in making up the original suspension; however, other materials which serve the purpose without causing objectionable side effects such as foaming or contamination of the intermediate product, can be substituted for the dust. For a continuous operation, moreover, I prefer to raise the density of the suspension to roughly 2.5.

The conveyor 18 is positioned laterally of the tank 20 so as to feed the particles into the tank at its point of maximum depth over the trough 25. Consequently, the largest measure of separation of the valued and non-valued materials occurs at his point with the former sinking to the bottom of the trough and the latter floating over the surface of the aqueous medium 29. Distribution of the nonvalued materials over the entire surface of the medium is prevented by an upright baffle 30 which is mounted across the length of the tank to one side of the trough above the leg 26. The lower edge of the baffle is elevated above the leg so as to provide a clearance for a chain drag comprising a pair of endless chains 32 interconnected by a series of paddles 36 which are engaged on the chains at regular intervals therealong. The chains are mounted on three pairs of sprockets, one pair 34 of which is positioned in the trough 25 and the other two pairs 34' and 34" of which are positioned at the ends of upward extensions of the legs 24 and 26. In use the sprockets are driven (by means not shown) so as to move the paddles in a direction leading downwardly along the inner surface of the leg 24, then upwardly along the surface of the leg 26, and then reversedly over the top of the tank. As the paddles move through the bottom of the trough 25 they scoop up the deposited valued materials and drag them up along the surface of the leg 26. The upward extension of the leg 26 forms a drainboard 26' for the drag so that the greater percentage of the aqueous suspension is drained from the materials by the time they reach the level of the sprockets 34" and are discharged off the end of the leg into a hopper 38 leading into the drier C.

In a simultaneous operation, the floated non-valued materials confined behind the baffle 30 are ejected by means of a float ejector 40 mounted on the opposite side of the trough 25 from the conveyor 18. The tank has a notched opening 42 on this side which is equipped with a lip 44 that receives the ejector and enables it to dip into the liquid medium 29. The ejector comprises a series of cleats or paddles 46 which are secured on a moving band 47 and angled out from it so as to skim off the floating materials and lift them up out of the tank onto a colander screen 14' waiting at the upper end of the ejector. The screen 14' serves a function similar to that of screen 14. It is vibratably mounted on an incline above a settling basin 16' so that the greater mass of the ejected particles are screened out and discharged off one end of the screen, while the heavier smaller particles, as for example, any lead compound dust, are passed into the basin below with the entrained liquid. In this basin, as in basin 16, the particles sink to the bottom of the collected liquid, where a screw conveyor 52 is positioned to catch the particles and to withdraw them up out of the basin and into the troughed portion of the tank 20. In this way, the lead compound dust is continually returned to the tank to contribute to the densification medium therein. Each of the basins 16 and 16' is also equipped with a drain 54 which transfers the collected liquid into a secondary settling basin (not shown) where it is brought to a clear state.

The particles screened out and discharged from the screen 16' are collected in a suitable waste receptacle (not shown) for disposal outside of the apparatus. A set of spray washers 55 above the screen serves to prepare the screenings for such disposal.

The valued materials are dried and prepared for the smelter D in the drier C which comprises a drum 56 that is mounted at a slight angle to the horizontal and rotated by a chain drive unit 58 powered by a motor 60. The inner wall of the drum is equipped with a series of longitudinal baffles 62 which serve to catch up the particles and tumble them about the drum as they move along its length. The drier is also equipped with a gas burner unit 64 which serves to heat the interior of the drum. The dried particles are ejected from the nearer end of the drum in the view into a screw conveyor 66 which discharges them directly into the smelter.

The apparatus in FIGURES 2A and 2B also performs four distinct operations, the last two of which duplicate those performed by the earlier described apparatus at the close of the process. Each of these, therefore, is also labeled C and D. In the case of the first two operations, however, there are several distinctions which shall be explained shortly. Of these, the first operation A' is that of draining and crushing the batteries. The second B' is that of separating the valued and non-valued materials in similar fashion to the second stage of the earlier apparatus, but omitting certain features therein.

Referring to the upper left-hand corner of FIGURE 2A, it will be seen that the batteries are introduced to the process by means of an open mesh conveyor 70 inclined upwardly from the horizontal. The batteries are placed on the conveyor in staggered relationship to one another so that there is a substantial gap between batteries. As each proceeds up the incline on the conveyor, it approaches a perforating mechanism which is indicated generally at 72. The perforating mechanism is comprised of a hydraulic ram 74 which is equipped with a plurality of spaced parallel fingers 76 on the driven end thereof. The fingers have irregular lengths and are arranged to pass through holes 78 at opposed positions in an upright plate 80 on the opposite side of the conveyor from the ram. The ram is operated by a hydraulic actuator 82 which in turn is operated by a photoelectric cell 84 disposed to note the passage of each battery on the conveyor. The signal generated in the cell causes the ram to advance in timed relationship to the movement of the battery, and to impale the battery against the plate 80 at a level near the bottom of the cells. In the course of the operation, the fingers 76 penetrate the battery and enter the holes 78 in the plate, and then withdraw in the reverse direction while a lip 86 on the adjacent side of the conveyor prevents the battery from clinging to the ram. The acid escapes through the resulting perforations and drains down through the open mesh of the conveyor into a collecting tank 88 below.

Following the perforating operation, the batteries are advanced to the top of the conveyor and then toppled into the nip of a roll crusher 6' such as was used in the earlier described apparatus. This inturn discharges the mass of comminuted particles onto an apron 90 which allows them to slip onto a belt conveyor 92 leading to the sink float separation cell B'.

The cell itself is constructed and operated in the same fashion as that used with the earlier described apparatus. However, in this case the lead compound dust is discharged directly into the cell with the larger comminuted particles. In addition, the float ejector 40 by which the floated nonvalued materials are removed, discharges the materials onto a colander screen 14' which passes the lead compound dust into a basin 16' that in this case, is not equipped with a conveyor for returning the dust to the cell. Instead, the lead compound dust and other heavier smaller particles are allowed to drain into a secondary settling basin 94 where they undergo settling in a quiescent liquid. Periodically the settled material is collected and removed from the basin.

In the apparatus of both drawings, the smeltering furnace 95 is equipped with a flue 96 through which the flue gases are discharged. Connected to the flue is a "bag house" 98 through which the flue is placed under negative pressure by a vacuum system (not shown) which operates to withdraw a substantial portion of the lead compound dust in the flue gases into the bag house. This dust is collected in the manner previously described and can be removed from the bag house at will. As indicated earlier, the operator has the option of using some of this dust to control the density of the suspension in the tank 20. For example, should the perforator 72 in the embodiment of FIGURES 2A and 2B malfunction or break down, the dust can be used to offset the dilution effect of the acid which will then be added to the tank. The same element of control is also available in the embodiment of FIGURES 1A and 1B.

The invention produces an end product which consists of those portions of the batteries which have some lead-bearing value. The product is entirely free of acid residual, moreover, so that in addition to a substantial gain in smelting efficiency over prior techniques, by virtue of the enriched charge, the smelter itself is less subject to erosion from the fact of the acid-free nature of the charge.

While the invention has been described with reference to a particular apparatus and practice thereunder, it will be understood that certain modifications and additions can be made in and to it without departing from the spirit and scope of the invention as it is defined in the claims following.

I claim as my invention:

1. A process for the continuous or continual recovery of metallic lead and/or lead alloys from a stream of waste storage batteriers having lead compound dust in the cells thereof, in a system having sink flotation and smeltering stages therein, comprising (1) subjecting a first portion of the stream of batteries to the sink flotation stage by comminuting at least the battery cells therein, and charging the mass of comminuted particles and liberated lead compound dust into a liquid suspension of a solid densification medium consisting essentially of lead compound dust, the quantity of which is adjusted to cause the valued and nonvalued particles in the mass to separate into diverse regions of the suspension; (2) removing the valued particles from the suspension and charging the same into the smeltering stage, together with the lead compound dust densification medium adhering thereon; and (3) subjecting a second portion of the stream of batteries to the sink flotation stage by comminuting at least the battery cells therein and liberating the lead compound dust therefrom, and charging the mass of comminuted particles from such second portion into the aforesaid suspension, together with at least enough of the lead compound dust liberated from the second portion, to compensate for the loss of lead compound dust densification medium adhering to the removed particles of the first portion.

2. The process according to claim 1 wherein substantially the whole of the lead compound dust liberated from the second portion batteries is added to the suspension.

3. The process according to claim 2 wherein the cells of the second portion batteries are comminuted, and the lead compound dust is liberated therefrom, by pulverizing the batteries in the whole state.

4. The process according to claim 3 wherein the second portion batteries contain an acid residual and the mass of comminuted particles therefrom is subjected to a screening operation preliminary to being charged into the suspension, so as to separate the acid residual from the mass; and the lead compound dust separated with the residual is subsequently removed from the same and separately charged into the suspension.

5. The process according to claim 3 wherein the second portion batteries contain an acid residual and the residual is liberated from the batteries in advance of the comminution step, and in such fashion as to result in no substantial loss of the dust in the batteries.

6. The process according to claim 3 wherein the second portion batteries contain an acid residual and the residual is charged into the suspension together with enough lead compound dust collected from the smeltering stage to offset the dilution effect of the acid on the nature of the suspension.

7. The process according to claim 1 wherein the valued first portion particles removed from the suspension, and the lead compound dust densification medium adhering thereon, are subjected to drying before they are charged into the smeltering stage.

8. The process according to claim 1 wherein the non-valued first portion particles are also removed from the suspension and enough of the lead compound dust liberated from the second portion is added to the suspension to offset the additional loss of densification medium adhering to these latter particles.

9. The process according to claim 1 wherein the non-valued first portion particles are also removed from the suspension and at least a portion of the lead compound dust densification medium adhering to the same, is separated therefrom and returned to the suspension.

References Cited

UNITED STATES PATENTS

| | | | |
|---|---|---|---|
| 1,507,951 | 9/1924 | Buckley | 209—173 |
| 1,895,504 | 1/1933 | Wuensch | 209—172.5 |
| 2,138,825 | 12/1938 | Allen | 209—172.5 |
| 2,347,264 | 4/1944 | Holt | 209—172.5 |
| 2,465,220 | 3/1949 | Garber | 209—172.5 |
| 2,521,347 | 9/1950 | Davis | 209—172.5 |
| 2,616,564 | 11/1952 | Schrock | 209—173 |
| 2,675,966 | 4/1954 | Kihlstedt | 209—173 X |
| 2,942,792 | 6/1960 | Anderson | 241—14 |
| 3,004,721 | 10/1961 | Notzold | 241—14 |
| 3,235,072 | 2/1966 | Nelson | 209—172.5 |
| 2,966,350 | 12/1960 | Neumann | 75—77 X |

FRANK W. LUTTER, *Primary Examiner.*